Jan. 13, 1948.                I. B. LASKOWITZ                2,434,276
         TILTABLE COUNTER-ROTATING ROTOR SYSTEM FOR
            HELICOPTERS AND CONTROL MEANS THEREFOR
                   Filed Jan. 6, 1943           2 Sheets-Sheet 2

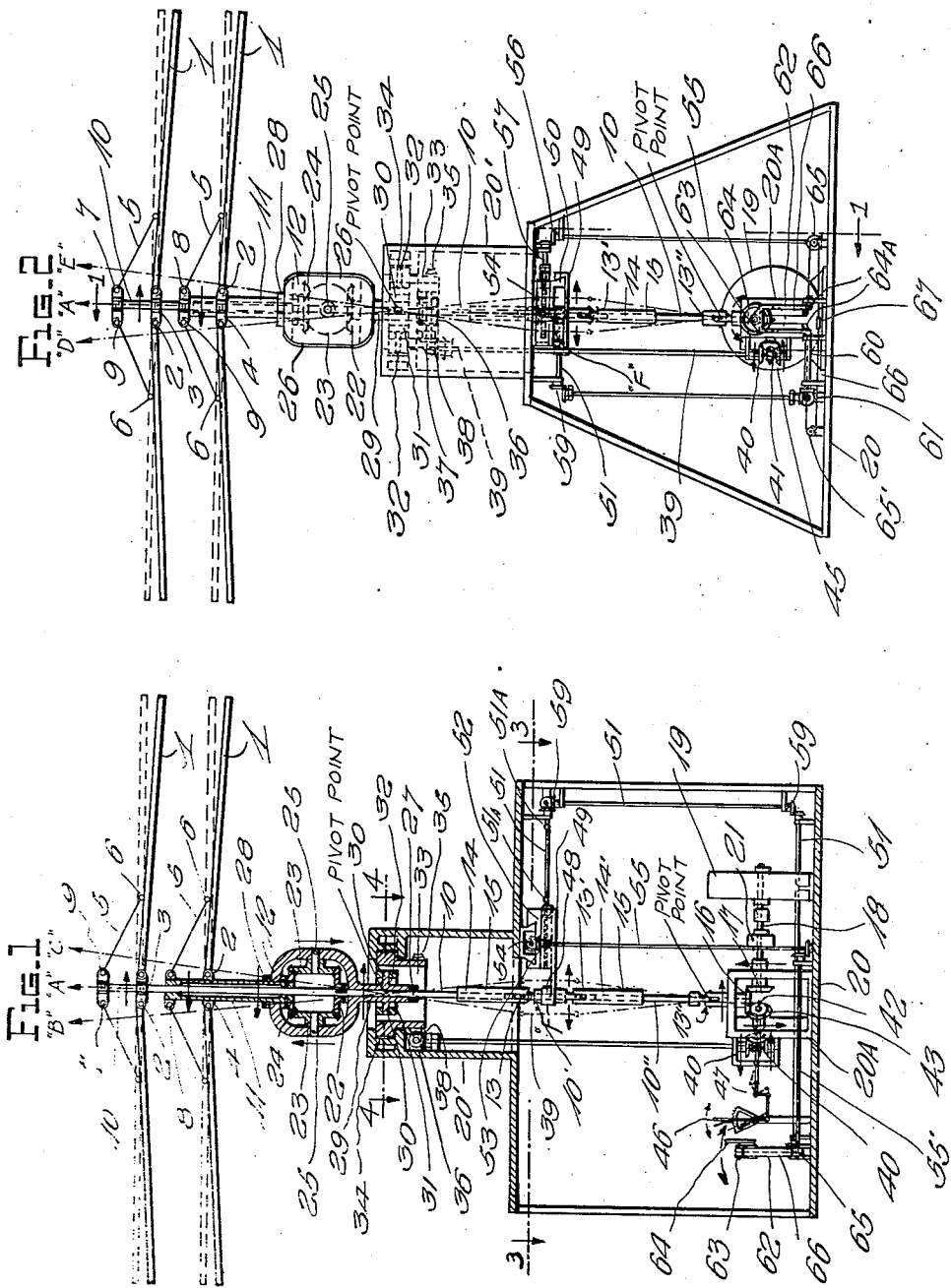

INVENTOR.
                     ISIDOR B. LASKOWITZ
                          BY
                             Robert C. Dennison
                                        ATTORNEY Patented Jan. 13, 1948

2,434,276

UNITED STATES PATENT OFFICE 2,434,276

TILTABLE COUNTER-ROTATING ROTOR SYSTEM FOR HELICOPTERS AND CONTROL MEANS THEREFOR

Isidor B. Laskowitz, Brooklyn, N. Y.

Application January 6, 1943, Serial No. 471,492

7 Claims. (Cl. 244—17)

1

This invention relates to tiltable counter-rotating rotor system for helicopters and control means therefor especially as it may be applied to aircraft and particularly to that type known as helicopters.

It is a primary object of this invention to provide such a mechanism as will readily and easily provide for ascent, descent, movement to the right or left, forward or rearward of the aircraft; provide for hovering or suspension in the air without movement relative to the ground; provide controlling or adjusting mechanism for maintaining lateral balance or stability and for maintaining longitudinal balance or stability; provide for steering movement about the vertical axis of the aircraft; provide for autorotation of the lift mechanism by providing "free-wheeling" thereof should the prime mover or motor fail, thus effecting descent safely without power in case such an emergency should arise.

Another object of the invention is to provide a mechanism and arrangement having all the qualifications above noted and yet be of such a compact nature as to occupy a small operating area horizontally eliminating all external surfaces or devices except for rotors which control the movement of or stationary condition of the aircraft.

A further object of the invention resides in the provision of variable thrust mechanism by means of which the direction of thrust may be varied to provide a vertical and horizontal component in any direction of the compass without rotation of the aircraft about its vertical axis.

Another object of the invention contemplates a variable thrust mechanism whereby direction of thrust may be varied to provide a vertical and horizontal component in any direction of the compass and concurrently effect control, at will, movement of the aircraft about its vertical axis for steering movement either clockwise or counterclockwise.

A further object is to provide a variable thrust mechanism embodying a pair of coaxially arranged rotors moving in opposite directions whereby to normally balance out the reaction torques set up by each rotor and yet, at will, vary the speed of one rotor with respect to the other to the extent that the reaction may differ to establish desired control of the aircraft.

Another important object of the invention is to embody the features of a variable thrust mechanism having the qualities set out above which will be relatively simple in construction yet positive in action, strong and durable with parts arranged to facilitate ready and easy adjustments whenever necessary, thus assuring its practicability.

Other objects and advantages of the present invention will become apparent from the following detailed description of a preferred embodiment of the invention illustrated in the accompanying drawings wherein like reference characters designate corresponding parts throughout the several views and wherein:

Figure 1 is a vertical section of a variable thrust mechanism embodying the invention taken substantially along line 1—1 of Figure 2;

Figure 2 is an elevation of the mechanism;

Figure 3:
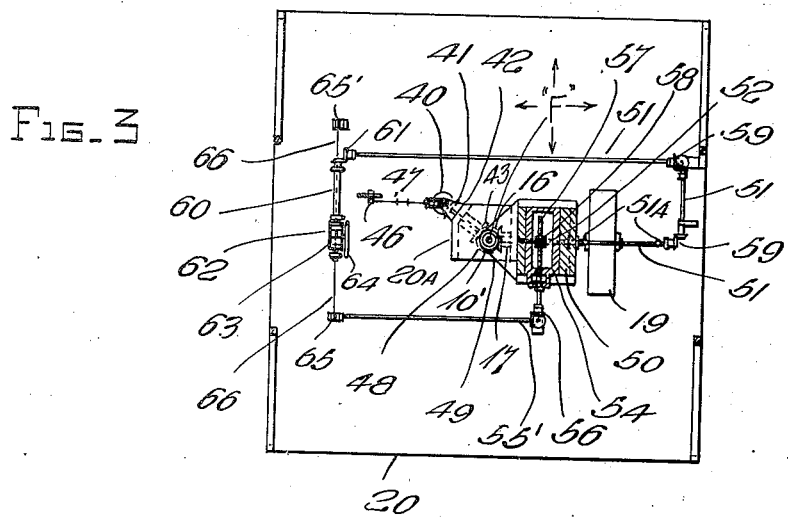
Figure 3 is a horizontal section taken substantially along the line 3—3 of Figure 1.

Referring now more particularly to the drawings, the preferred embodiment is illustrated as embodied in a helicopter wherein airfoils, vanes or blades 1 constructed of any suitable or preferred material constitute the rotors. Each blade is pivotally mounted at its inner end on a pin 2, upper pins 2 being carried by a collar 3 while a collar 4 carries the pins for the lower rotor. Pivotal movement of the blades about their respective pins below a predetermined angle is controlled by means of flexible tie members or links 5 connected to the blades at 6 and to suitable collars 7 and 8 provided for the upper and lower rotors respectively, by means of pins 9. When rotating, the blades may be in vertical oscillation and one such assumed position is illustrated in dotted lines in Figures 1 and 2.

All parts fixedly secured together are preferably welded to each other although any other preferred method of rigidly securing the members may be employed as desired.

With two sets of rotors preferably employed as illustrated in Figures 1 and 2, the upper rotor is carried by a vertical or upright shaft 10 rotatably mounted within a tubular member 11 which carries the lower rotor, thus providing for coaxial support of the rotors. Shaft 10 extends into and through a gear housing 12 and is rotatable therein. The lower end of shaft 10 is splined into a sleeve 14 having universal connection with a stub shaft 10' at 13 at its upper end while the lower end has universal connection at 13' with a sleeve 15 suitably splined with an extension shaft 10" connected by means of universal 13" to a bevel gear 16. Gear 16 meshes with a similar gear 17 carried on the drive shaft 18 of an engine or motor 19 mounted on the base of the supporting frame 20. A gear bracket 20A is provided for supporting shafts 10 and 18 and bevel gears 16 and 17.

An automatic declutching or "free-wheeling" device 21 of any suitable or preferred type is interposed between engine or motor 19 and bevel gear 17 whereby the vertical shaft sections, sleeves and universals are free to rotate when the engine or motor is not functioning. A standard brake mechanism of any suitable or preferred type (not shown) may be associated with any portion of the vertical driving shafting to prevent its rotation when desired, or when the engine or motor is not operating. When the engine or motor is operating, power will be transmitted through the vertical shafting to the upper rotor, the latter revolving at such speed as may be desired by the pilot and depending upon the speed decided upon by merely adjusting the throttle controlling the engine or setting the brake hereinbefore noted. Shaft 10 is keyed or feathered to gear 22 carried in the gear housing 12. This gear 22 is connected by means of idler gears 23 to gear 24 which is suitably secured to the tubular member 11, gears 23 being carried by pins 25. Gears 22, 23 and 24 are freely rotatable within gear housing 12 and may be submerged in a suitable lubricant retained in the housing by cover plates 26. Gear casing 12 may be retained from vertical displacement by thrust collars 27 and 28 carried by shaft 10 and sleeve 11, respectively. It will be obvious that when shaft 10 and its associated rotor are rotated in one direction, sleeve 11 and its respective rotor will be rotated in the opposite direction through the medium of the differential gearing described.

Downwardly directed from gear housing 12 is an extended cylindrical neck portion 29 carrying pins 30 pivotally mounted in a gimbal ring 31 in turn carrying pins 32 rotatably mounted in a tubular member 33 supported in an internal annular seat 34 in the upper portion of frame 20 constituted by a vertical tubular extension 20'. Tubular member 33 may rotate within its annular seat 34 and its lower end is provided with an external peripheral worm gear ring 35 secured thereto. A worm pinion 36 meshes with ring 35, being carried on a horizontal shaft 37. A set of bevel gears 38 transmit rotary motion to shaft 37 from a vertical shaft 39 whereby rotation of the latter shaft will impart rotation to the tubular member 33 and such rotation in either direction may be transmitted as is imparted to shaft 39. It will be understood that with tubular member 33 remaining stationary, when the engine or motor 19 is operating, the upper and lower rotors will revolve at the same speed and consequently the reaction torques of the rotors will balance each other, thereby eliminating any tendency for the mechanism to rotate about its vertical axis. On the other hand, with the two sets of rotors operating under motive power, if tubular member 33 is rotated in either direction, gear housing 12 will also be rotated thereby correspondingly varying the speed of the lower rotor. Thus, it may be possible to set up in the lower rotor a reaction torque which is greater or less than the reaction torque of the upper rotor and this difference in the reaction torques will cause the craft to rotate about its vertical axis in a clockwise or counterclockwise direction depending upon the directional rotation of shaft 39.

Figures 4, 5:
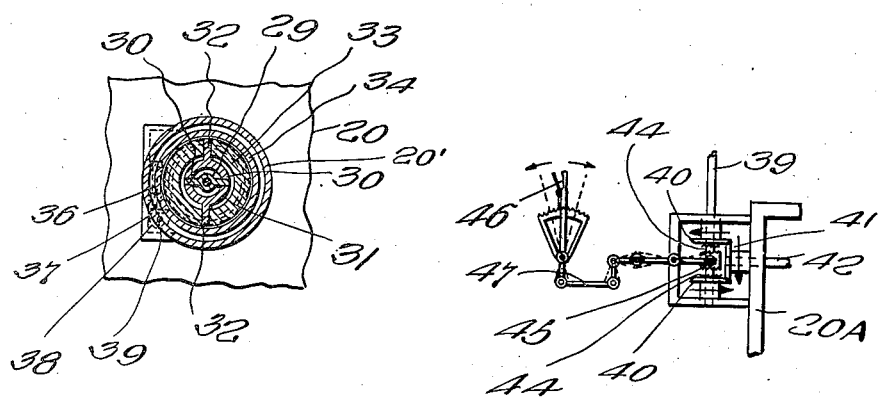
Figure 4 is a fragmentary horizontal section taken along the line 4—4 of Figure 1.
Figure 5 is an enlarged fragmentary elevation of control and operating mechanism employed in the preferred embodiment to effect clockwise and counterclockwise rotation of the mechanism about its vertical axis.

Shaft 39 has rotatably mounted at its lower end, opposed spaced bevel gears 40 (Figures 1, 2 and, more particularly, Figure 5) which are enmeshed with gear 41 driven by the engine or motor 19 through shaft 42 and bevel gear 43 (see Figure 1) driving off gear 16. Inner end faces of gears 40 are provided with clutching portions 44 of the frictional or tooth type adapted to be engaged by a slidable clutching member 45 that is keyed or splined on shaft 39, suitably provided at its outer ends with cooperating corresponding clutching portions complementary to portions 44. As illustrated in Figure 5, member 45 is in a neutral position, thus immobilizing shaft 39. However, should this member 45 be shifted to engage upper bevel gear 40 by means of linkage 47 responding to movement of lever 46, shaft 39 will be caused to move in one direction while shifting of lever 46 in the opposite direction will cause member 45 to engage lower gear 40, thus imparting rotation to shaft 39 in the opposite direction. Thus, it will be seen that a simple control has been provided to retain shaft 39 stationary or to cause it to rotate clockwise or counterclockwise as the case may be. The provision of the pivot point indicated in the ring 31 together with the provision of the universal connections in the vertical or upright shafting provides for angular displacement of shaft 10 from the vertical by horizontal shifting of stub shaft 10' at point F causing resultant thrust due to the inclination imposed upon the rotors when the shafting is shifted from the vertical position A to any other position such, for example, as B, C, D or E, as illustrated. Resultant thrust in position B would cause forward translation of the craft; in position C, movement would be to the rear; in position D, movement would be sidewise to the left; and in position E, sidewise and to the right. By varying the inclination from position A to either B or C, longitudinal stability or control may be had while shift to positions D or E provides for lateral stability or control. With rotation of the craft about its vertical axis by means of rotation of gear housing 12, stability and control of the craft about all three axes is obtained.

For the purpose of moving the stub shaft 10' at point F in a horizontal plane, I prefer to employ the wheel and rocking bridge control mechanism together with one of the eccentric brackets or adjustable bearings more fully and specifically described and claimed in U. S. Letters Patent No. 1,872,758, granted to me August 23, 1932, for Variable thrust mechanism.

Briefly, such mechanism may be applied in the present disclosure by encircling stub shaft 10' at point F with a bearing 48 constituting a part of eccentric bracket 49. The latter is slidably carried on a slotted member 50 and may be moved from side to side as viewed in Figure 1 by rotating shafting or spindles 51 threaded at its end at 52 and extending through a threaded boss 53 carried by the eccentric bracket 49. Slotted member 50 is in turn slidably mounted on a frame member 54 secured to frame 20. This arrangement provides for lateral movement at right angles to the direction of movement possible in Figure 1 as will be apparent from Figure 2; such movement being responsive to rotation of shaft 55. Bevel gears 56 operatively connect shaft 55 with a threaded spindle 57 which is in turn associated with an internally threaded boss 58 provided in the slotted member 50. Bevel gears 59 provide driving connections between the various sections of the shafting 51 and the shaft 55 for transmitting rotary motion from each section to the next section. Near the ends of upper shaft section 51, there are provided universal joints 51A to allow for its inclination whenever the eccentric bracket 49 is moved from side to side. Shaft sections 51 are driven by the hollow shaft 60 by means of bevel gears 61.

Attached to the inner end of the shaft 60 is an inverted U-shaped rocking bridge 62. A suitable grooved flexible cable drum 63 is mounted at the top of bridge 62 and is adapted to be turned by a hand control wheel 64. Adjacent the bottom portion of the rocking bridge, there are provided a pair of pulleys or guide sheaves 64A. Shaft section 55' of the shaft 55 is adapted to extend along the bottom of frame 20 toward the rocking bridge and has a grooved drive pulley 65 secured thereto. A similar grooved pulley 65', but acting only as an idler pulley, is disposed in opposed relation to pulley 65. A flexible cable 66 of wire rope preferably is wound around drum 63, sheaves 64A, through hollow shaft 60 and around pulleys 65 and 65'. The ends of the cable are preferably secured by a turnbuckle 67 for purposes of adjustment when necessary.

As will be evident, the construction and arrangement is such that by turning control wheel 64 in one direction, the eccentric bracket 49 will move to one side or the other as indicated by the arrows in Figure 2 depending upon the direction of rotation of wheel. Also, by inclining the rocking bridge 62 or dipping it fore and aft, the eccentric bracket is moved in opposite directions at right angles to the previously described movement in the direction of the arrows illustrated in Figure 1. Thus, it is possible to vary the resultant thrust of the mechanism in any direction as hereinbefore described.

Variable thrust mechanism of the character described may be applied to land or water craft or to any other type of craft in which it may be useful. The compactness of the arrangement is such as to readily lend itself to use in a confined area both as to craft and the space which may be available for operation of the craft. It will be clear that all controls are proximately disposed and are of a positive acting nature so as to avoid any element of failure of operation and control. Since the thrust or lift of a single rotor is approximately proportional to the area of rotation of the same, by employing dual rotors in vertical tandem or superposed spaced relation, the required area of operation has been cut approximately in half. Thus, the operating area of the craft is materially reduced as above noted. This is important in taking off and landing in close spaces.

Obviously, minor changes may be made in the preferred embodiment without departing from the essence of the invention or the scope of the appended claims. Thus, ball or roller bearings may be employed in place of the sleeve bearings disclosed. Rigid blades may, of course, be employed in place of the pivoted blades shown. It is contemplated that other equivalent mechanical control movements might be substituted for the ones shown without essentially departing from the spirit of the invention.

Having thus described the invention, what is claimed and desired to be secured by Letters Patent is:

1. A helicopter comprising a supporting frame, a pair of concentric shafts mounted on said frame for universal tilting movement with relation thereto, each of said shafts having a bladed rotor unit secured thereto, a differential gear mechanism interconnecting said shafts for driving said shafts in opposite directions, means connected to said shafts for varying the relative speeds of rotation of said shafts, one of said shafts having an extended portion connected by means of a universal joint to a source of power, and a bracket structure connected to said extended portion and mounted for displacement in a plane transverse to the said shafts, said extended portion including universal joints and splined axially slidable connections above and below the point of connection to said bracket structure, whereby tilting of the rotor units may be effected in any desired direction by appropriate displacement of said bracket structure to control and stabilize the helicopter.

2. A helicopter, comprising a supporting frame, a pair of concentric shafts, bladed rotor units secured on said shafts, differential gearing mechanism operatively connected to said shafts whereby said rotor units may be operated in opposite rotary directions, said differential mechanism being connected to said frame by gimbal means for universal tilting movement above said frame, one of said shafts having an extended portion extending downwardly into said frame, in combination with a prime mover located in said frame and connected to said extended portion, said extended portion being provided with a pair of universal joints and splines located between said gimbal means and said prime mover, and a shaft section connecting said pair of universal joints, a bearing embracing said shaft section, said bearing being supported by an adjustable bracket structure, said bracket structure and bearing being mounted to move transversely in any direction relative to said extended portion for simultaneously tilting said concentric shafts and their units, control means connected to said bracket structure to actuate the same to any position of desired adjustment, tubular means connected to said gimbal means and rotatively mounted in said frame to rotate about an upright axis, driving means connected to said tubular means and to said prime mover, a reversible clutch mechanism interposed in said driving means, and means to control said clutch mechanism.

3. A helicopter comprising a supporting frame, a pair of concentric shafts, each of said shafts having a bladed rotor unit secured thereto, a differential gear mechanism interconnected with said shafts for driving said shafts in opposite directions, said gear mechanism being connected to said frame by gimbal means to permit universal tilting movement of said shafts relative to said frame, the inner shaft extending through said gear mechanism and being provided with an extended portion extending into said frame and operatively connected to a prime mover therein, said extended portion having a pair of universal joints and a pair of spaced splined connections, a bearing embracing said extended portion between said splined connections, an adjustable bracket structure secured in said frame and supporting said bearing, said bracket structure and bearing being adjustable transversely in any direction relative to said extended portion, actuating means connected to said bracket to adjust the same to any desired position, and mechanism to control said actuating means, a tubular means rotatively mounted on said frame for receiving and supporting said gimbal means, driving means connected to said tubular means and to said prime mover, a reversing clutch mechanism interposed in said driving means and connected thereto, and control means connected to said clutch to actuate the same.

4. A helicopter comprising a supporting frame, a pair of concentric shafts, each of said shafts having a bladed rotor unit secured thereto, a differential gear mechanism interconnecting said shafts for driving said shafts in opposite directions, a tubular means rotatively mounted on said frame, said tubular means receiving gimbal means and supporting the same therein, said gimbal means receiving the lower portion of said gear mechanism and supporting said gear mechanism to permit universal tilting movement of said shafts relative to said frame, the inner shaft extending through said gear mechanism and being provided with an extended portion extending into said frame and operatively connected to a prime mover in said frame, said extended portion being provided with a shaft section, universal joints and splines connecting said shaft section to the upper and lower portions of said inner shaft, an additional universal joint interposed in said inner shaft and located below said lower spline, an adjustable bracket structure mounted in said frame and disposed laterally of said shaft section, an arm on said bracket structure, said arm having a bearing thereon embracing said shaft section, means connected to said bracket structure for shifting said bearing and shaft section transversely of the axis of said inner shaft, and means for controlling said shifting means, said tubular means being operatively connected with driving means therefor, a reversible clutch mechanism for operatively connecting said driving means to said prime mover, and additional means connected to said clutch mechanism for controlling the same.

5. A helicopter comprising a supporting frame, a pair of concentric shafts mounted on said frame for universal tilting movement with relation thereto, each of said shafts having a bladed rotor unit secured thereto, a gear mechanism interconnecting said shafts for driving said shafts in opposite directions, means connected to the outer shaft to vary the speed of the outer shaft relative to the speed of the inner shaft, the inner shaft having an extended portion extending into said frame and connected to a prime mover, therein, said extended portion having universal joints and spaced splined connections thereon, adjustable means connected to said extended shaft portion whereby the adjacent section of said portion may be shifted transversely of the axis of the inner shaft to effect tilting of said shafts, and means connected to said adjustable means to control the shifting thereof.

6. A helicopter comprising a supporting frame, a pair of concentric shafts, each of said shafts having a bladed rotor unit secured thereto, a gear mechanism interconnecting said shafts for driving said shafts in opposite directions, a prime mover located in said frame, the inner shaft extending through said gear mechanism and having an extended portion extending into said frame and connected to said prime mover, said outer shaft and gear mechanism being connected to said frame by gimbal means to permit universal tilting movement of said shafts relative to said frame, said gimbal means having a tubular outer ring rotatively supported in said frame, said extended portion being provided with a shaft section interposed therein and connected thereto by universal joints and splines, an additional universal joint being also interposed below the lower spline in said extended portion, a bearing embracing said shaft section, said bearing having mounting means therefor in said frame for transverse adjustment in any direction relative to said shafts, control means connected to said mounting means to actuate said mounting means in any direction transversely of said shaft section, said outer ring being provided with a worm wheel on the exterior lower portion thereof, said worm wheel having operative connection to said prime mover, reversing means interposed in said connection including control means therefor, and means for disengaging said prime mover upon failure thereof, and thereby provide for descent safely of said helicopter.

7. A helicopter comprising a frame, a shaft assembly including a pair of concentric shafts, a pair of superposed spaced rotors secured respectively on said shafts, said frame having side, top and bottom walls, said top wall having a centrally disposed opening in combination with a tubular portion having an open lower end, said tubular portion being disposed over said opening and fixedly secured thereto, gimbal means anchored and supported in the upper end of said tubular portion, said gimbal means embracing and supporting the concentric shaft assembly, a differential housing mounted on said shaft assembly, said housing containing a differential gear mechanism interconnecting said shafts, whereby rotation of the inner shaft will rotate the outer shaft in an opposite direction, the outer ring of said gimbal means having means for supporting it rotatively within said tubular portion, said outer ring also having a depending portion, said depending portion being provided on its outer surface with a worm wheel, a prime mover on the bottom wall aforesaid, drive means forming a connection with said worm wheel and said prime mover, a reversing mechanism interposed in said drive means whereby said housing may be driven selectively in either of two directions to vary the relative speeds of rotation of the concentric shafts.

ISIDOR B. LASKOWITZ.

REFERENCES CITED

The following references are of record in the file of this patent:

UNITED STATES PATENTS

| Number | Name | Date |
|---|---|---|
| 1,014,643 | Donnelly | Jan. 16, 1912 |
| 1,055,533 | Highland | Mar. 11, 1913 |
| 1,578,833 | Kogler | Mar. 30, 1926 |
| 1,788,218 | Wettstein | Jan. 6, 1931 |
| 1,957,813 | Wilford | May 8, 1934 |
| 2,172,334 | Theodorsen et al. | Sept. 5, 1939 |
| 1,718,577 | Pitcairn | June 25, 1929 |
| 2,352,342 | Pitcairn | June 27, 1944 |